TWO-WAY PLOW WITH SYNCHRONIZED GUIDED TAIL WHEEL

Original Filed Feb. 17, 1967 6 Sheets-Sheet 1

TWO-WAY PLOW WITH SYNCHRONIZED GUIDED TAIL WHEEL

Original Filed Feb. 17, 1967 6 Sheets-Sheet 2

TWO-WAY PLOW WITH SYNCHRONIZED GUIDED TAIL WHEEL

Original Filed Feb. 17, 1967 6 Sheets-Sheet 3

TWO-WAY PLOW WITH SYNCHRONIZED GUIDED TAIL WHEEL

Original Filed Feb. 17, 1967 6 Sheets-Sheet 4

TWO-WAY PLOW WITH SYNCHRONIZED GUIDED TAIL WHEEL

Original Filed Feb. 17, 1967 6 Sheets-Sheet 5

TWO-WAY PLOW WITH SYNCHRONIZED GUIDED TAIL WHEEL

Original Filed Feb. 17, 1967 6 Sheets-Sheet 6

United States Patent Office

Re. 27,850
Reissued Dec. 25, 1973

27,850
TWO-WAY PLOW WITH SYNCHRONIZED GUIDED TAIL WHEEL

Glen Armon Watts, Rte. 1, Box 258,
McMinnville, Oreg. 97127

Original No. 3,507,334, dated Apr. 21, 1970, Ser. No. 616,842, Feb. 17, 1967. Application for reissue Mar. 27, 1972, Ser. No. 238,700
The portion of the term of the patent subsequent to Dec. 2, 1986, has been disclaimed
Int. Cl. A01b *3/28*
U.S. Cl. 172—212 5 Claims

Matter enclosed in heavy brackets [ ] appears in the original patent but forms no part of this reissue specification; matter printed in italics indicates the additions made by reissue.

ABSTRACT OF THE DISCLOSURE

Steerable tail wheel arrangement for two-way plow involving pulleys or the like connected to tractor and mating with reversing pulleys or the like direct-connected to tail wheel to steer tail wheel in direction opposite to change in direction of tractor.

This invention relates to gang plows of the type in which a single carrier has mounted thereon two sets of plowshares, one for right-hand throws and one for left-hand throws and in which either set, at the will of the operator, may be placed in active position.

The invention relates further to means for controlling the rear-most steering wheel of a gang plow as aforesaid so as to automatically synchronize the motions of the steering wheel with those of a tractor and to have it assume optimum position regardless of which set of plows are in operation.

In the nature of things, gang plows carrying four or more bottoms are considerably elongated and while the front end is supported on the usual two or three point tractor hitch, due to the elongation, it is necessary to provide a supporting and steering wheel at the rear end of the gang plow assembly.

In most two-way gang plows the assembly comprises a central member, elongated, hitched to the tractor at one end and having a steering wheel pivoted at the other. Two sets of plows, one right-hand one left-hand, usually will be mounted on this member for rotation around it so that each set alternately may be placed in active position. The elongated member which actually supports the plows and delivers to them the pull generated by the tractor will be referred to throughout the specification as the "drawbar," although this term usually is used to refer to the crossbar running between the lower hydraulic lift members of a tractor and forming a part of the conventional three point hitch. "Drawbar" as applied to the elongated member offers certain convenience of reference in this case, however, and is adopted for the particular purpose of this application.

Assuming that the tractor is moving forward in a straight line and that the set of plows in active position are operating for left-hand furrows, that is, turning the earth to the left of the direction of tractor advance, the wheel at the rear of the drawbar will lie to the right side of the center of the tractor path but the plane of the wheel transverse its axis must be parallel to the direction of tractor advance. When, on the other hand, the plow is rotated to use right-hand plows, the rear wheel must be to the left of center and the plane of the wheel must still be parallel to the direction of advance of the tractor. Now, whether following either right-hand or left-hand furrows, if the tractor turns to the left, the rear wheel must turn to the

[righ] *right* in order to minimize the turning radius of the tractor and gang plow as a whole and the contrary is true when the turn is reversed. This necessity for reverse direction of the steering wheel relative to a turn made by the tractor has been recognized in the patent to Manheim 3,061,020, dated Oct. 30, 1962. This patent, however, neither recognizes nor solves the problem raised by alternate use of two-way plows.

It has also been proposed to provide automatic steering for the rear wheel in a two-way plow but such proposals involve with each change; right to left or vice-versa, a separate adjustment of the overall length of the linkage to accommodate the swing-over, from right to left, of the drawbar axis relative to the centerline of the tractor's advance.

Accordingly, it is an object of this invention to provide a gang plow as aforesaid, having automatic steering in which the plows may be shifted from right-hand to left-hand without other adjustment or alteration of any of the parts than is involved in the swinging action from right to left or vice-versa.

It is a further object of this invention to provide in a gang plow as aforesaid, for a hollow drawbar having its interior relatively unobstructed to provide free passage for such hydraulic lines as may be required for control of the lowering and raising of the rear steering wheel with consequent lowering and raising of the rear end of the drawbar itself.

It is a further object of this invention to provide a hitch back of the rear end of the drawbar to which such auxiliary equipment as harrows or seeders may be attached, said hitch being so arranged as to be unaffected in its action on such auxiliary equipment by the change from right-hand to left-hand furrows.

The above and other objects will be made clear from the following detailed description taken in connection with the annexed drawings, in which.

Figure 1:
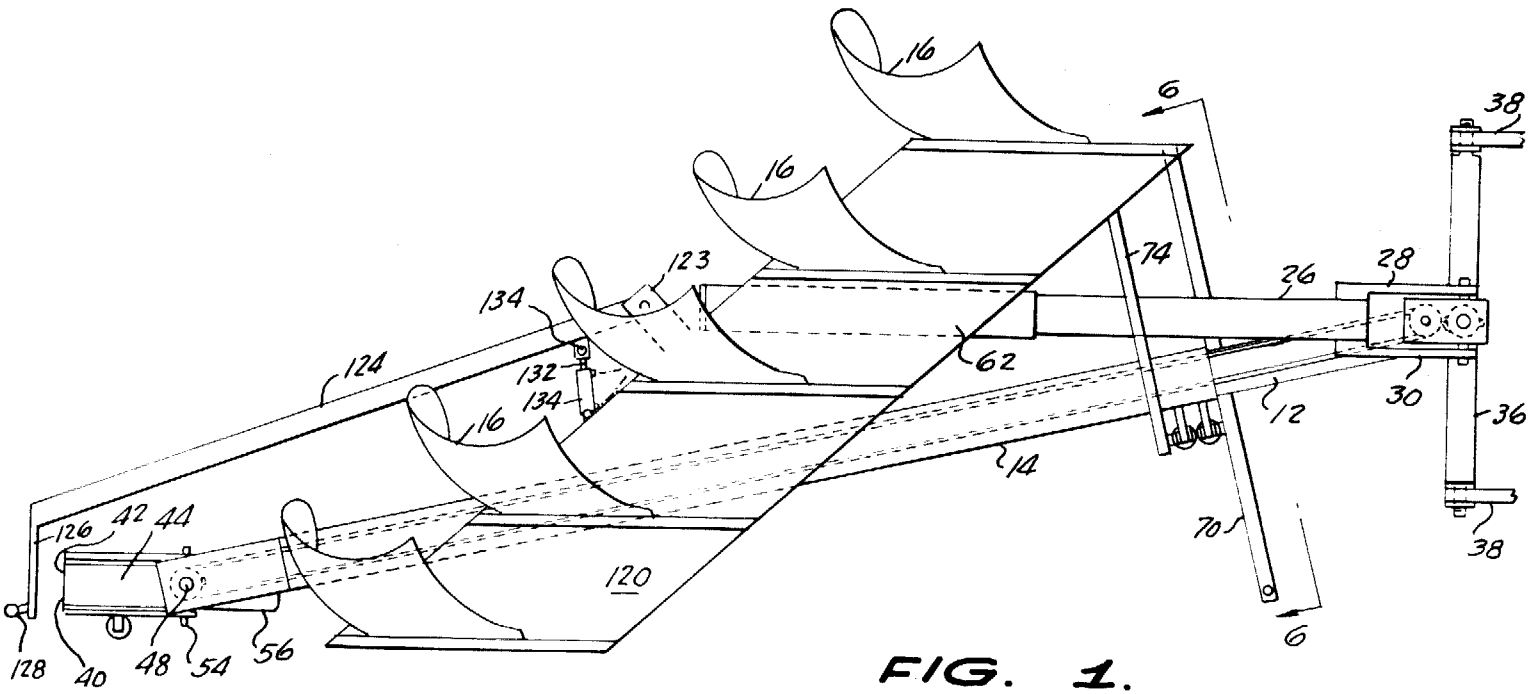
FIG. 1 is a plan view of a preferred form of this invention.
Figure 2:
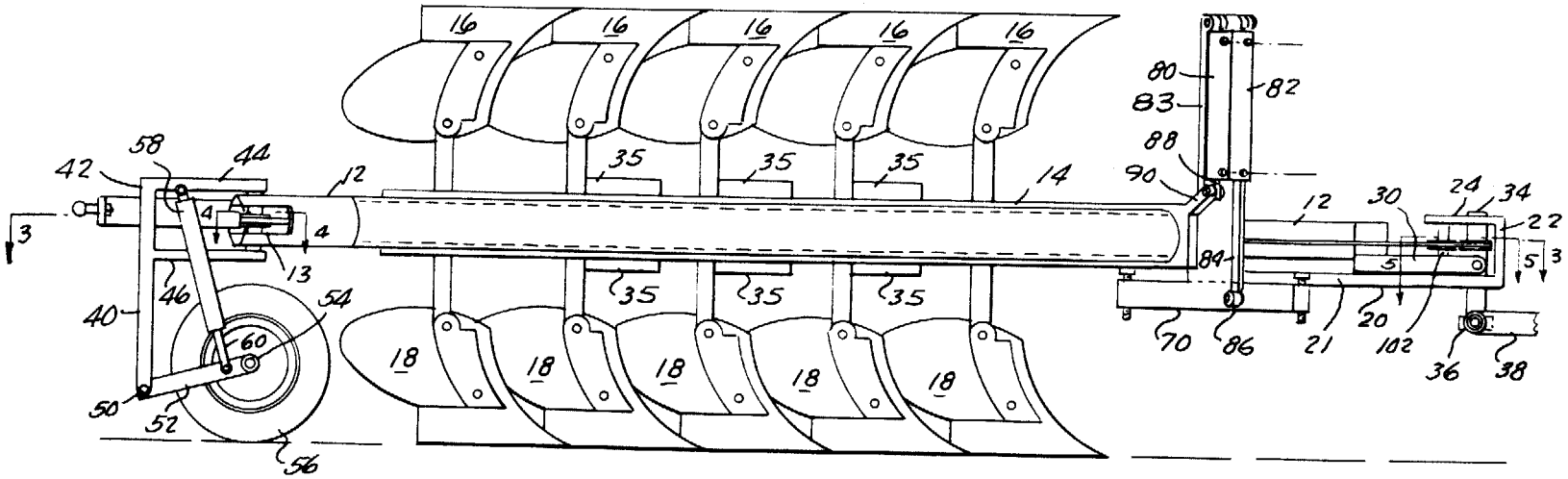
FIG. 2 is a side elevation of FIG. 1.

Referring now to FIG. 1, the gang plow assembly as a whole is generally indicated by the numeral 10. This assembly is made up of a drawbar 12 surrounded by a sleeve 14. A set of plows 16 in inactive position lies above the sleeve 14. As shown in FIG. 2, a second set of plows 18 underlies the plows 16 and is shown in active position. The two sets 16 and 18, of course, are of opposite hand.

Figure 5:
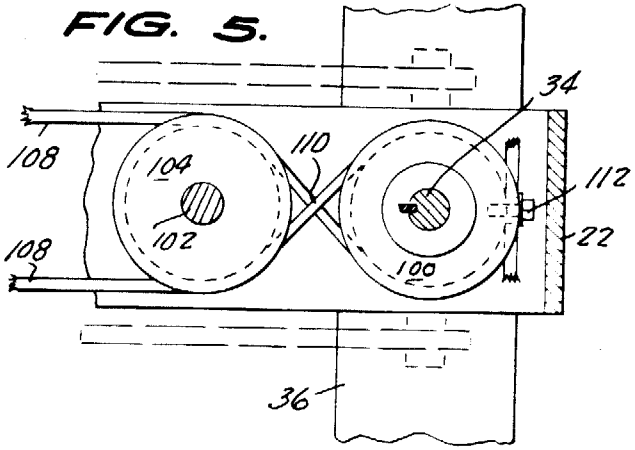
FIG. 5 is a section on the line 5—5 of FIG. 2.
Figure 3:
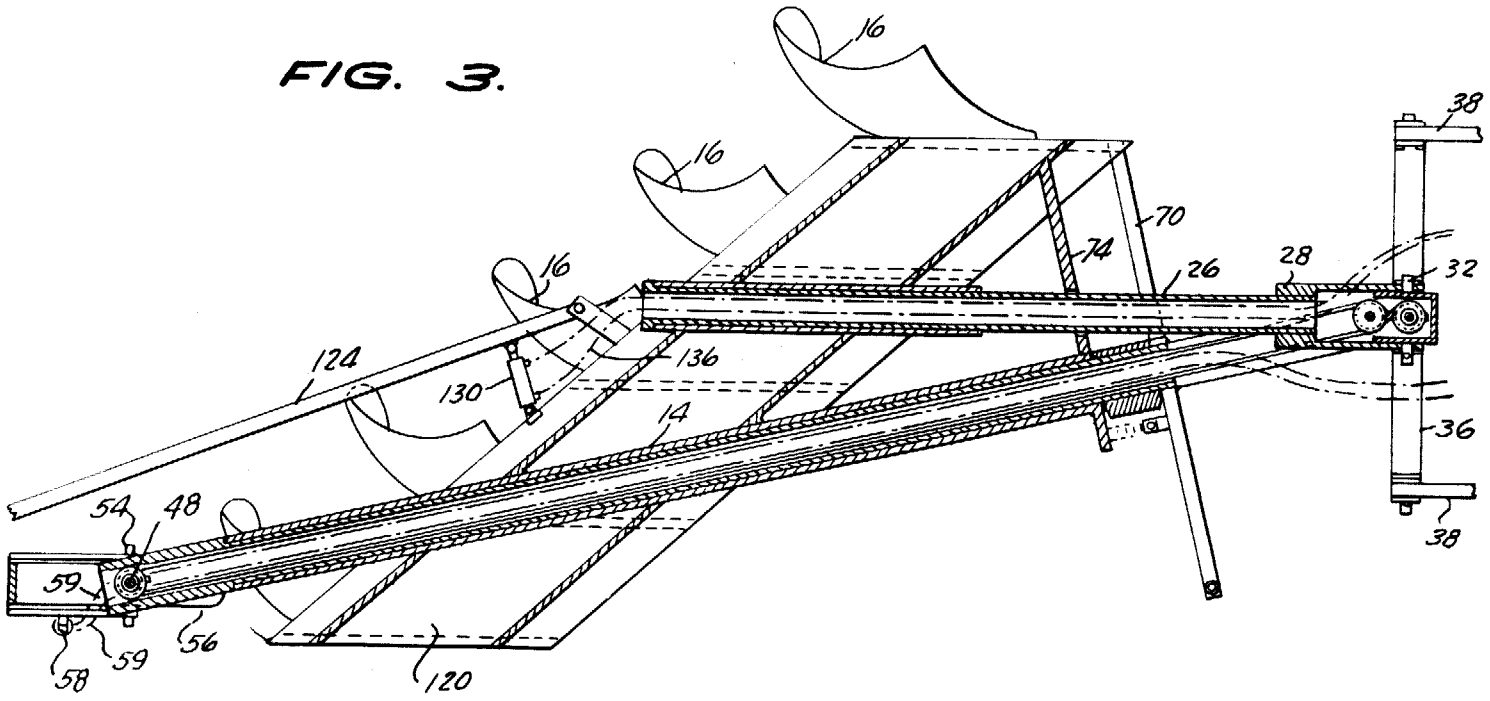
FIG. 3 is a view similar to FIG. 1, partially in section and taken on the line 3—3 of FIG. 2.
Figure 11:
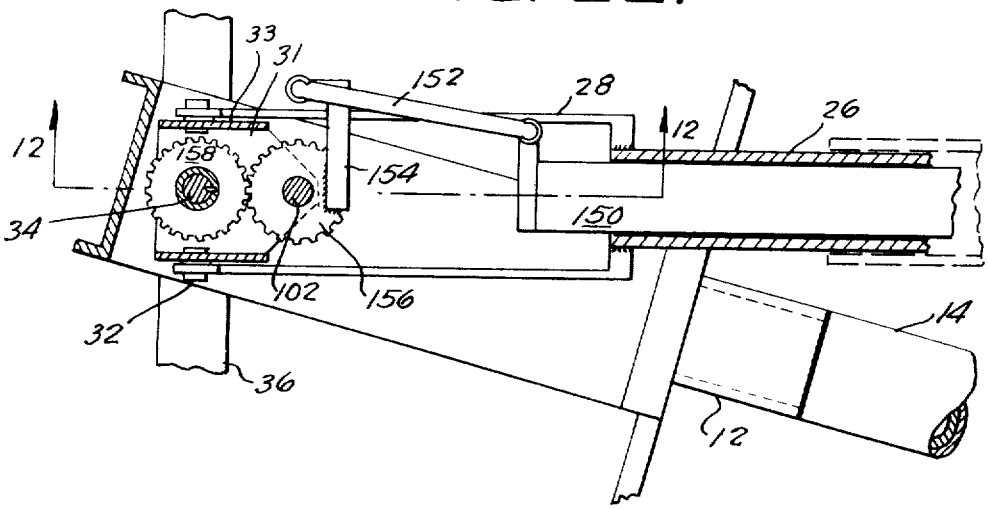
FIG. 11 is an enlarged view partially in section of the forward end of FIG. 10.

Secured to the front end of the drawbar 12 is a horizontal strip 20 (FIG. 2) which, at its forward end, is bent up to form a vertical portion 22 and then back to form a horizontal portion 24. As best shown in FIG. 1, there is an additional horizontal bar 26 having its front end secured to a pair of spaced members 28 and 30 which, as shown in FIGS. 2, 3 and 5, are pivoted on a horizontal axis to a pair of pins 32. The pins 32 are mounted in a box frame 33 having vertical walls 31, as shown in FIG. 11. The axle 34 pivotally passes through the members 20 and 24 secured to the drawbar 12. This relationship is best illustrated in FIGS. 2 and 5.

The axle 34 as noted passes through the lower member 20 and is fixedly secured to the tractor crossbar 36 which is supported at each end by horizontal pivots on the conventional tractor lift bars 38. This relationship is best illustrated in FIGS. 1, 2, 3 and 11.

Referring now to the left-hand end of FIGS. 1 and 2, there is shown a bracket member 40 having a vertical portion 42, an upper horizontal portion 44 and a lower horizontal portion 46. A pivot pin 48 having a vertical axis is mounted between the horizontal portions 44 and 46 of the bracket 40. At its lower end the vertical portion 42 of the bracket 40 is pivoted at 50 to a link 52 and at the opposite end of the link (a pair of which are provided) there is a horizontal axle 54 on which a steering wheel 56 is mounted. The axis of the pin 48 intersects the axis of the axle 54 so that turning movement of the bracket 40 about the pin 48 brings about an exactly corresponding turning movement of the wheel 56. A piston 58 is pivoted to the upper horizontal member 44 of the bracket 40 and a piston rod 60 operating within the cylinder 58 is pivoted to the link 52 connecting the bracket 40 with the axle 54 of the wheel 56. It is clear that hydraulic pressure applied to the top of the cylinder 58 will tend to expel the piston 60 and thereby to lift the entire rear end of the assembly.

Referring again to FIG. 1, the auxiliary drawbar 26 is slidably and rotatably mounted in a sleeve 62 and is also secured to both sets of plows 16 and 18. Now, with both sets of plows secured to the sleeve 62 on the drawbar 26 and sleeve 14 on the drawbar 12, and with both sleeves 14 and 62 being rotatable about their respective drawbar, it is geometrically possible, when the main drawbar [14] *12* is elevated by means of the wheel 56, the cylinder 58 and the piston 60 to such an extent that both sets of plows 16 and 18 are free of the ground to rotate both sets of plows so that the set 18 may be replaced in active position by the set 16. Such a move is accompanied by a reversal of the angular relationship of the drawbars 12 and 26 from the position indicated in FIGS. 1 and 3. The new angular relationship is best shown in FIG. 10, although FIG. 10 is devoted to a modification of the steering mechanism.

Figure 9:
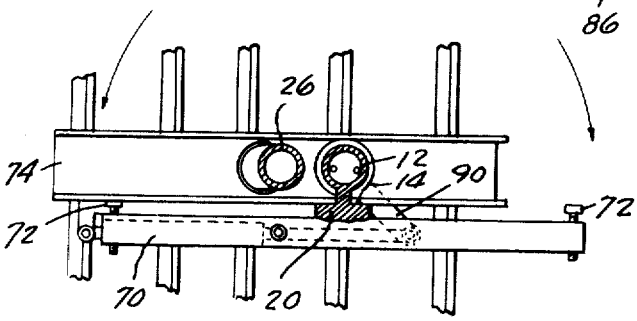
FIG. 9 is a view similar to FIGS. 6 and 8, showing complete rotation of the plows.
Figure 10:
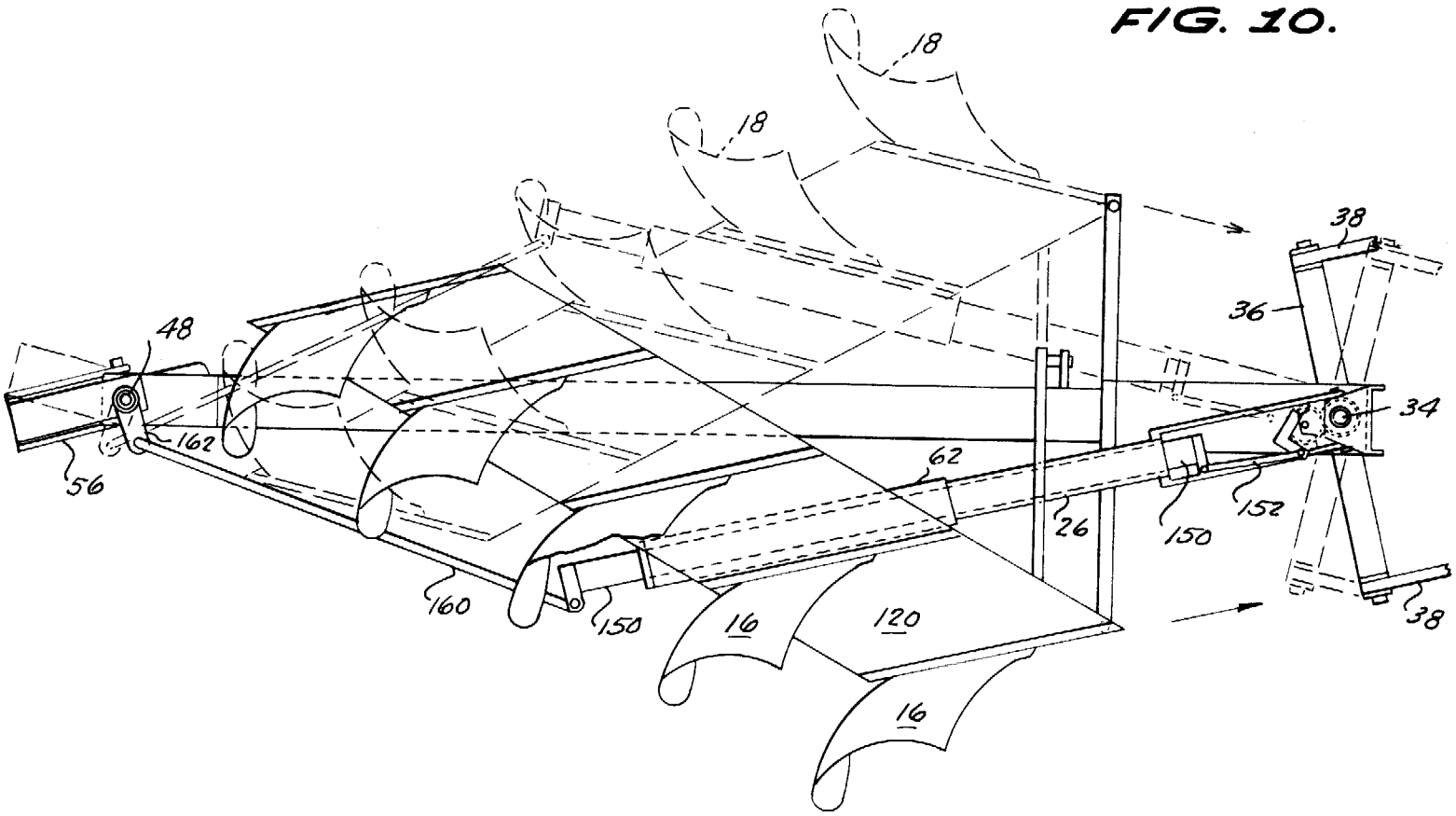
FIG. 10 is a plan view similar to FIG. 1, showing a modified form of steering control.

The relationship of the drawbars 12 and 26 from that shown in FIG. 1 to that shown in FIG. 10 is extraordinarily difficult to portray within the limits of two-dimensional illustration. Moreover, the precise means by which the change in relationship is accomplished are not in detail, particularly relevant to the steering mechanism per se and while certain means will be described, these are to be considered illustrative rather than limitative and will be described in connection with FIGS. 6–9 with collateral reference to FIGS. 1 and 3.

Figure 6:
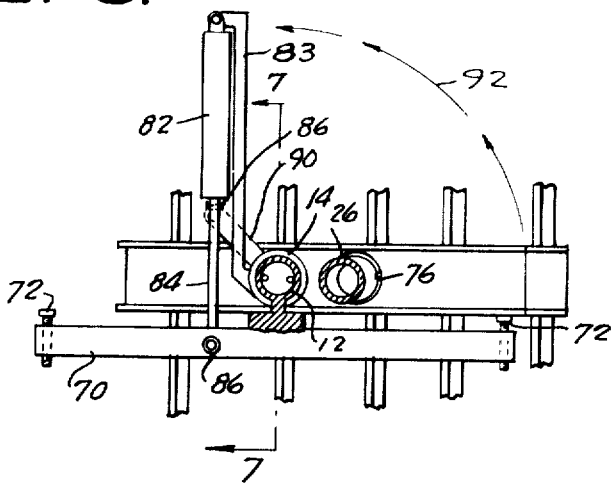
FIG. 6 is a view partially in section, taken on the line 6—6 of FIG. 1.

Referring now to FIG. 6, the member 20 (see FIG. 2) is welded into the drawar 12 in the area 21 and is in turn welded to a cross member 70 having adjustable stops 72 at its opposite ends. Somewhat to the rear of the bar 70 (see FIGS. 1, 2 and 3) a cross member 74 is penetrated by and welded to the sleeve 14 on the drawbar 12. The auxiliary drawbar 26 also penetrates the member 74 through an elongated slot 76. The shift from right-hand to left-hand plows starts with the bar 74 in the position shown in FIG. 6. It is then rotated to the position shown in FIG. 8 and continues rotation to its final position shown in FIG. 9. The stops 72 on the bar 70 regulate the ultimate active position at each extreme.

Figure 8:
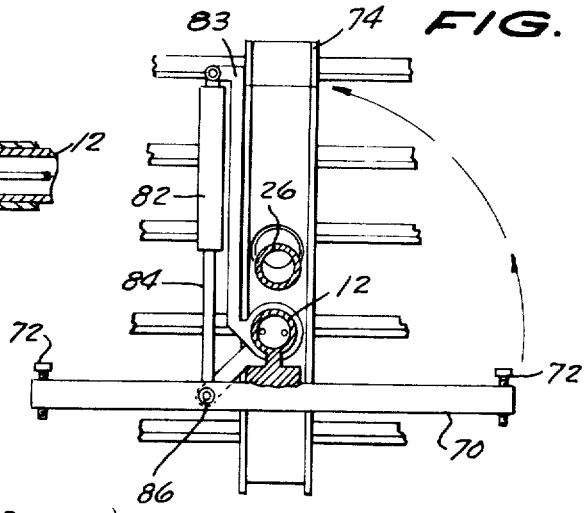
FIG. 8 is a view similar to FIG. 6, showing the plows partially rotated.

Obviously, a variety of power-operated means could be used to effect the swinging motion illustrated in FIGS. 6, 8 and 9.

Figure 7:
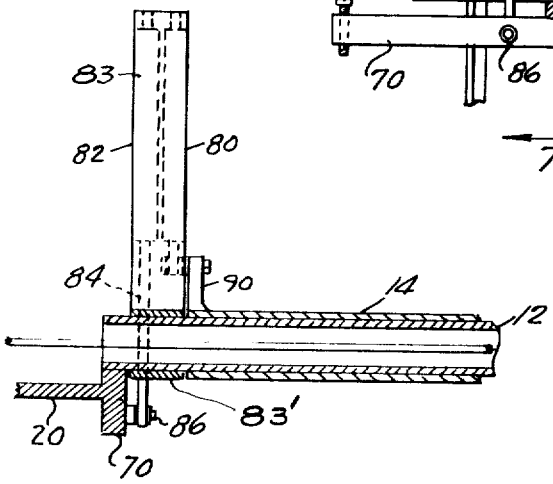
FIG. 7 is a partial section taken on the line 7—7 of FIG. 6.

In this case, rotation is accomplished by a pair of hydraulic cylinders 80 and 82, best shown in FIGS. 2, 6 and 7. *The cylinders are supported at their outer ends pivotally on the outer end of a support member 83 the inner end of which is journaled on the drawbar 12 by sleeve 83', as shown in FIG. 7.* As best shown in FIGS. 2, 6 and 8, the cylinder 82 which is double-acting has a piston rod 84 extending from the [piston] *cylinder* 82 to a pivot 86 on the cross member 70. As shown in FIGS. 2 and 6, the [piston] *cylinder* 80 has a rod 88 pivoted to an arm 90 secured to the sleeve 14 on the drawbar 12. To make the move from the *position shown in FIG. 6 to that shown in FIG. 8, fluid is introduced at the* top of the cylinder 80, expelling from the cylinder the rod 88 and turning the sleeve 14 and the associated parts including the cross member 74 and the auxiliary drawbar 26 in the direction of the arrows 92. When the rod 88 reaches the limit of its stroke within the cylinder 80, the parts have reached the position shown in FIG. 8. At this time, fluid is admitted to the bottom of the cylinder 82 withdrawing the rod 84 into the cylinder and swinging the members 74 together with the cylinders 80 and 82 to the left of FIG. 8 and down into the horizontal condition illustrated in FIG. 9. When it is desired to reverse the position from that of FIG. 9 to that of FIG. 6, the foregoing cycle is repeated in reverse.

The preferred steering mechanism is shown in FIGS. 1 through 5. As will appear hereinafter, this particular mechanism transmits steering effort from the front to the rear end of the drawbar 12 entirely within the drawbar 12 which makes possible the use and manipulation of a hitch for auxiliary equipment to the rear of the gang plow which equipment will also be described hereinafter.

Figure 4:
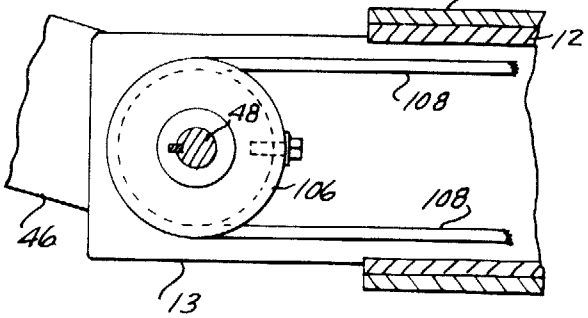
FIG. 4 is a section on the line 4—4 of FIG. 2.

It has already been noted regarding FIG. 2 that the member 20 is secured to the drawbar 12 as a vertical portion 22 and horizontal portion 24 penetrated by and rotatably mounted on a pin 34 which is fixedly secured to the cross bar 36. Below the horizontal member 24 and also below the pivot 32, there is a pulley 100 keyed to the pin or axle 34 and therefore immovable relative to the cross bar 36. Mounted between the horizontal members 20 and 24 and just to the rear of the axle 34 is an axle 102 on which is freely journaled a pulley 104. At the opposite end of the drawbar 12, the drawbar is provided with forked end members 13 which rotatably receive the axle 48 which is secured fixedly to the horizontal members 44 and 46 of the bracket 40 and a pulley 106 is keyed to the axle 48 so that, as previously described, rotation of the pulley will rotate the axle 48 and consequently cause equivalent rotation of the wheel 56. A belt 108 passes around the pulley 106, as shown in FIG. 4, and extends through the drawbar 12 to the pulley 104. After partially wrapping around the pulley 104, ends of the belt 108 cross at the point marked 110 and continue around the pulley 100 until they meet and are secured together and to the pulley 100 by a bolt 112. By loosening the bolt 112, the belts may be tightened and rendered effective whenever loosened under excessive wear and stretch. The crossing of the ends of the belt 108 at the point 110 provides a reversal of the effect of pulley 100, which reverse effect is transmitted to the pulley 106, thence to the wheel 56. It follows therefore that if the bar 36 is tilted to the left of FIG. 5, the pulley 100 will be rotated counterclockwise while the pulleys 102 and 106 are rotated clockwise. The reverse is true if the cross member 36 is tilted to the right of FIG. 5.

In FIG. 5, the member 20 and therefore the drawbar 12 extend at right angles to the cross bar 36. This is a "neutral" position in which the drawbar 12, the axles 34, 102 and 48 all have their axes in a common vertical plane, which plane would bisect the wheel 56. This is a position the parts would occupy when the gang plow as a whole is being transported down the highway. When the parts are in the position shown in FIG. 1, the drawbar 12 is at an angle to the cross bar 36, but the vertical plane of the wheel 56 remains at right angles to the bar 36. This condition will remain so long as the tractor moves straight ahead with the path of movement at right angles to the bar 36. If, under these conditions, the tractor makes a left turn, thereby turning the bar 36 counterclockwise relative to the drawbar 12, the wheel 56 will be rotated clockwise about the pivot 48 which is precisely correct steering for a device of this type and, of course, the reverse will happen should the tractor make a right turn from the position shown in FIG. 1. The arrangement shown in FIGS. 1–5 is particularly desirable when it is necessary to use an auxiliary hitch at the rear of the gang plow for towing such auxiliary equipment as harrows, planters, pulverizes, etc. This hitch is best described with reference to FIG. 1, in which 120 indicates a member joining the plows 16 and secured to the sleeves 62 and 14.

The hitch is best described with reference to FIG. 1, in which 120 represents a member to which the plows 16 are secured and which in turn is secured to the sleeves 62 and 14 for rotation of the plows about the sleeve or with the sleeve 14 about the drawbar 12. The bracket 123 is secured to the member 120 for rotation therewith. A link 124 has one end pivoted to the bracket 123 and the other end horizontally extended in an arm 126 to which a conventional ball hitch 128 is secured. For many purposes, it will be desirable to have the ball hitch 128 lined with the pivot 48. For other purposes, it may be desired to shift the ball hitch 128 outwardly from the position shown in FIG. 1. When it is desired to vary the relationship between the path of the plowshares 16 and 18 and that of the auxiliary equipment attached to the ball hitch 128, a hydraulic cylinder 130 is provided, pivoted to the member 120 and having a piston rod 132 pivoted at 134 to the member 124. Depending on the size and length of the cylinder 130, a considerable shift of the ball hitch 128 may thus be secured. The cylinder 130 is operated by hydraulic lines 136 which, in FIG. 6, run through the auxiliary drawbar 26 and hence to controls within reach of the tractor operator. One of the great advantages of this type of hitch is that by bringing the element 128 in line with the axis of drawbar 12, the plows can be rotated left to right or vice-versa without raising the hitch element 128.

The cylinder 58, on the other hand, is actuated by hydraulic lines 59 which run through the main drawbar 12.

Figure 12:
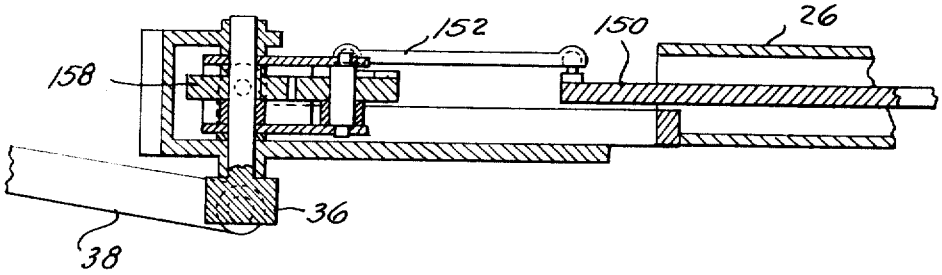
FIG. 12 is a section on the line 12—12 of FIG. 11.
Figure 13:
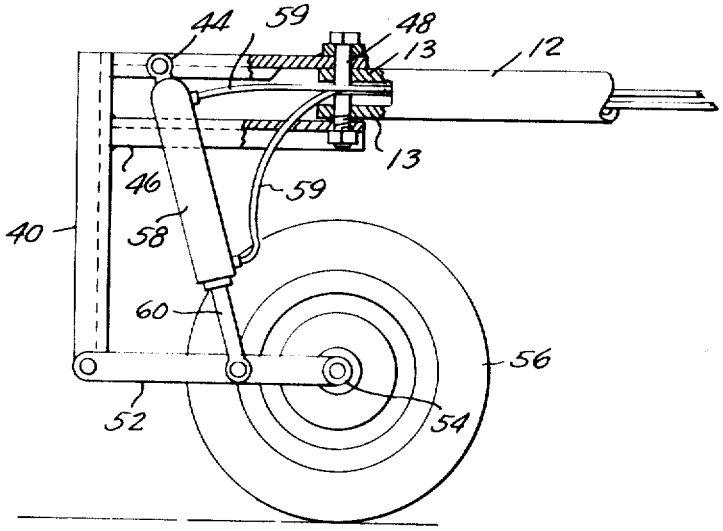
FIG. 13 is a partial section of the rear end of the drawbar, showing how the hydraulic lines for elevating the steering wheel are passed through the center of the drawbar.

Referring now to FIGS. 10, 11 and 12, an elongated member 150 is slidably mounted to extend throughout the auxiliary drawbar 26 and at its forward end is pivotally connected to a link 152 which in turn is pivoted to an L-shaped link 154. The link 154 is welded to a pinion 156 freely rotatable on the axle 102 and meshing with a pinion 158 keyed to the axle 34 which, as previously noted, is rigidly mounted on the cross bar 36. At its rearward end, member 150 is pivoted to a link 160 which in turn is pivoted to a lever 162 keyed or otherwise secured to the axle 48. The effect of the mechanism just described is to make the steering wheel 56 responsive to turning movement of the tractor relative to the drawbar 12 precisely as was accomplished by the pulleys and belts discussed in FIGS. 1–9. As best shown in FIG. 13, the arrangements of FIGS. 10–12 permit the hydraulic lines 59 to run from the piston 58 through the main drawbar 12. It is especially to be noted that the pivots of the link 152 are ball and socket joints. This is necessary in order to permit rotation of the drawbars 12 and 26, as described in connection with FIGS. 6–9.

It will be noted that this invention has provided a means for automatic steering which [reqrires] *requires* no adjustment in shifting from right-hand plows to left-hand plows and vice-versa. This has never been achieved before.

While certain construction details have been disclosed herein, it is not intended the invention be limited to the precise structures disclosed.

What is claimed is:

[1. A two-way gang plow having a drawbar: a steering wheel journaled at one end of the drawbar; two sets of plows of opposite hand mounted to rotate about said drawbar to put one set or the other into active position; means to connect said drawbar to a tractor, said means and said steering wheel having a single set of interconnections of fixed proportions responsive to turning movements by said tractor to turn said steering wheel in a direction opposite to the direction of said tractor turn, said interconnections being so arranged as to accommodate either of said sets of plows without adjustment.]

[2. A gang plow according to claim 1, in which said interconnections run through said drawbar.]

[3. A gang plow according to claim 1, in which said interconnecting means include pulleys and a flexible cable.]

[4. A gang plow according to claim 3, in which said flexible cable for most of its length runs through said drawbar.]

[5. A gang plow comprising: a main drawbar; an auxiliary drawbar at an angle to said main drawbar, two sets of plows, each set being of opposite hand from the other, both sets being supported by both drawbars, and both sets, together with said auxiliary drawbar, being rotatable about said main drawbar.]

[6. A gang plow as set forth in claim 5, including power-operated means for rotating said sets of plows and said auxiliary drawbar about said main drawbar to bring a selected set of plows into active condition.]

[7. A gang plow as set forth in claim 6, including a hitch for auxiliary equipment at the rear of said main drawbar; means pivotally supporting said hitch on said plows, and power-operated means to shift said hitch in a horizontal plane with respect to said main drawbar.]

[8. A gang plow as set forth in claim 7, in which said hitch is rotatable with said plows about said main drawbar.]

*9. In a two-way gang plow having a drawbar arranged for connection at its forward end to a tractor, plow mounting means supporting two sets of plows of opposite hand and mounted rotatably on the drawbar to put one set or the other of the plows into active position, the combination therewith of power operated means for rotating the plow mounting means comprising*

*(a) a cylinder support member journaled at one end on the drawbar,*

*(b) first and second extensible fluid pressure cylinders each supported at one end pivotally by the end of the support member opposite its journaled end,*

*(c) the opposite end of the first cylinder being connected pivotally to the plow mounting means, and*

*(d) the opposite end of the second cylinder being connected pivotally to the drawbar,*

*(e) whereby sequential extension or retraction of the cylinders effects rotation of the plow mounting means through correspondingly successive arcs of about 90° each, to rotate the plow mounting means through about 180° and exchange positions of the two sets of plows.*

*10. The combination of claim 9 wherein the cylinders are disposed side by side, extension of one cylinder effects rotation of the plow mounting means through an arc of about 90° in one direction, and retraction of the other cylinder effects rotation of the plow mounting means through an additional arc of about 90° in the same direction.*

*11. A two-way gang plow having a drawbar, a steering wheel journaled at one end of the drawbar, two sets of plows of opposite hand mounted to rotate about said drawbar to put one set or the other into active position, means to connect said drawbar to a tractor, said means and said steering wheel having a single set of interconnections of fixed proportions including pulleys and a flexible cable responsive to turning movements of said*

*tractor to turn said steering wheel in a direction opposite to the direction of said tractor turn.*

*12. The gang plow of claim 11 wherein said flexible cable for most of its length runs through said drawbar.*

*13. In a two-way gang plow having a drawbar arranged for connection at its forward end to a tractor, a supporting wheel engaging the drawbar for supporting the latter above the ground, plow mounting means supporting two sets of plows of opposite hand and mounted rotatably on the drawbar to put one set or the other of the plows into active position, the combination therewith of a hitch for towing auxiliary equipment rearward of the drawbar, comprising*

*(a) an elongated hitch link member,*

*(b) a connector member on the rearward end of the hitch link member for connecting auxiliary equipment thereto,*

*(c) means mounting the hitch link member adjacent its forward end pivotally on the plow mounting means for movement of the connector member between a position rearward of the drawbar and in substantial alignment with the rotational axis of the plow mounting means and a position laterally of the rearward end of the drawbar when a set of plows is in active position, and*

*(d) power-operated means interengaging the plow mounting means and hitch link member for moving the latter.*

References Cited

The following references, cited by the Examiner, are of record in the patented file of this patent or the original patent.

UNITED STATES PATENTS

| | | | |
|---|---|---|---|
| 437,666 | 9/1890 | Sobey | 172—285 |
| 1,416,613 | 5/1922 | Colardeau | 280—442 X |
| 2,316,397 | 4/1943 | Briscoe | 280—463 |
| 3,386,518 | 6/1968 | Nellen | 172—225 |
| 1,189,524 | 7/1916 | Baal | 172—282 |
| 3,232,354 | 2/1966 | Schlabs | 172—162 |
| 3,428,135 | 2/1969 | Richey | 172—225 |
| 3,428,136 | 2/1969 | Johannsen et al. | 172—225 |
| 3,524,509 | 8/1970 | Richey | 172—212 |
| 2,777,373 | 1/1957 | Pursche | 172—212 |
| 2,845,014 | 7/1958 | Pursche | 172—212 |
| 3,357,500 | 12/1967 | Harris | 172—161 |
| 1,213,912 | 1/1917 | Sergeant | 172—202 |
| 1,646,486 | 10/1927 | Lytle | 172—202 |
| 2,796,816 | 6/1957 | Gray | 172—202 |
| 1,134,149 | 4/1915 | Mowry | 172—223 |

FOREIGN PATENTS

| | | |
|---|---|---|
| 1,070,432 | 12/1959 | Germany. |
| 1,023,095 | 3/1966 | Great Britain. |
| 950,912 | 2/1964 | Great Britain. |
| 263,496 | 1/1912 | Germany. |
| 77,352 | 10/1918 | Austria. |

ROBERT E. PULFREY, Primary Examiner

E. H. EICKHOLT, Assistant Examiner

U.S. Cl. X.R.

172—225, 227, 285; 280—442, 463